United States Patent [19]

Pazzucconi et al.

[11] Patent Number: 5,789,336

[45] Date of Patent: Aug. 4, 1998

[54] MICRO-MESOPOROUS GEL AND PROCESS FOR ITS PREPARATION

[75] Inventors: Giannino Pazzucconi, Pavia; Gianluca Bassi, Milan; Roberto Millini, Cerro al Lambro; Carlo Perego, Carnate; Giovanni Perego, Milan; Giuseppe Bellussi, Piacenza, all of Italy

[73] Assignee: Eniricerche S.p.A., Milan, Italy

[21] Appl. No.: 371,395

[22] Filed: Jan. 11, 1995

[30] Foreign Application Priority Data

Jul. 6, 1994 [IT] Italy .......................... MI94 A 001399

[51] Int. Cl.⁶ .................................... B01J 21/08
[52] U.S. Cl. .................. 502/240; 502/242; 502/246; 502/263; 502/64; 502/233; 502/234; 502/235; 502/236; 502/237; 502/238; 502/239
[58] Field of Search .................. 502/405, 407, 502/240, 242, 246, 263, 64, 233, 234, 235, 236, 237, 238, 239; 506/240, 241, 246, 263, 64, 233, 234, 235, 236, 237, 238, 239

[56] References Cited

U.S. PATENT DOCUMENTS

| 4,666,692 | 5/1987 | Taramasso et al. | 423/326 |
| 5,049,536 | 9/1991 | Bellussi et al. | 502/235 |
| 5,434,118 | 7/1995 | Carati et al. | 502/242 |
| 5,510,555 | 4/1996 | Brunelli et al. | 585/508 |

*Primary Examiner*—Glenn Caldarola
*Assistant Examiner*—Thuan D. Dang
*Attorney, Agent, or Firm*—Oblon, Spivak, McClelland, Maier & Neustadt, P.C.

[57] ABSTRACT

Micro-mesoporous gel consisting of a silica matrix possibly wherein one or more metal oxides selected from transition metals or metals belonging to groups IIIA, IVA and VA are uniformly dispersed, characterized by a monomodal porosity distribution.

17 Claims, 17 Drawing Sheets

MICRO-MESOPOROUS GEL AND PROCESS FOR ITS PREPARATION

BACKGROUND OF THE INVENTION

The present invention relates to a micro-mesoporous gel, consisting of a silica matrix in which one or More metal oxides having a catalytic activity, are possibly dispersed.

More specifically the present invention relates to a micro-mesoporous gel consisting of a silica matrix in which one or more metal oxides selected from transition metals or metals belonging to groups IIIA, IVA and VA are possibly uniformly dispersed, characterized by a monomodal porosity distribution, and a process for its preparation.

The present invention further relates to the use of this gel as a heterogeneous catalyst, as an absorbent or as a catalyst support, in processes of industrial interest.

DESCRIPTION OF THE BACKGROUND

Among the various materials known in the art which can be used in different fields, such as heterogeneous catalysis, the separation of liquids or gases, ion exchange, are zeolites which are porous crystalline alumino-silicates of a natural or synthetic nature.

A special characteristic of zeolites is the presence of a controlled microporosity, with channels having dimensions of between 3 Å and 7 Å approximately. In some particular zeolitic structures, there are porosities of greater dimensions, up to about 13 Å. On the basis of the average dimensions of the channels, the zeolites are classified as having small, medium or large pores, the latter having an average pore diameter of about 7 Å.

The preparation of zeolites with channels having an average diameter of more than 7 Å still of great interest in the field of heterogeneous catalysis as it widens the possibilities of the use of these materials in reactions involving bulky organic molecules, which are not possible with the microporous systems known at present. These materials could be used in industrial processes for the production of intermediates for the chemical industry, fine chemicals and, above all, for the transformation of refinery heavy feeds and for the process called Fluid Catalytic Cracking (FCC). Attempts at synthesizing zeolites of this kind have had no success so far, even though an aluminium phosphate called VPI-5, with an average pore diameter of about 12.1 Å described by M. E. Davis, C. Saldarriaga, C. Montes, J. Garces and C. Crowder, Nature (1988), Vol. 331, page 698, has recently been prepared together with Cloverite, a gallium phosphate characterized by pores with a diameter of between 6 Å and 13.2 Å as described by M. Estermann, L. B. McCusker, Ch. Baerlocher, A. Merrouche and H. Kessler, Nature (1981), Vol. 352, page 320.

A practical use in acid-catalized reactions of the above products is prejudiced however by a weak acid strength, a low thermal stability and limited resistance to hydrothermal treatments.

The possibility of synthesizing an amorphous silica-alumina with a high surface area characterized by a narrow mesoporosity distribution (with pore dimensions within the range 37 Å–150 Å) has been described by M. R. Manton and J. C. Davidtz, Journal of Catalysis (1979), Vol. 60, pages 156–166. These materials however have not found practical applications.

More recently, European patent 463.673 and U.S. Pat. Nos. 4,992,608 and 5,049,536 disclose the possibility of obtaining amorphous alumino-silicates with a rather narrow pore-size distribution (average diameter of about 10 Å or less, substantial absence of pores with a diameter greater than 30 Å) and excellent catalytic properties in-acid-catalized reactions. These properties probably derive from the fact that the method of preparation used allows an uniform distribution of the aluminium in tetrahedral co-ordination. This permits the above amorphous alumino-silicates to be classified as zeolite-type materials.

The process for the synthesis of the above materials is, in fact, similar to that typically used for some zeolites and differs in the substantial absence of hydrothermal treatment. The process involves the mixing of a silica source (preferably tetraethylorthosilicate, TES) and an aluminium source (a trialkoxide, preferably tri-n-propoxide or tri-isopropoxide) with an aqueous solution of a hydroxide of tetra-alkylammonium ($R_4N$—OH, with R=ethyl, n-propyl, n-butyl). The solution is subsequently gelified by heating to a temperature of between 50° C. and 70° C. In this way, a partial evaporation of the alcohols produced by the hydrolysis of the reagents is obtained. The gel obtained is then dried and calcinated to give the final product.

Even more recently, Italian patent application MI 93 A 002696, discloses amorphous alumino-silicates characterized by a very narrow dimensional distribution of the micro-mesoporosity, obtained by a process wherein the gelification is carried out at the boiling point (or a little higher) of the alcohols produced by the hydrolysis of the reagents, without eliminating the alcohols themselves from the reaction mixture. This process can be easily carried out in a reactor equipped with a reflux cooler or in a closed autoclave, operating at autogenous pressure. The ammonium bases claimed are still of the $R_4N$—OH type (with R=ethyl, n-propyl, n-butyl, n-pentyl). The positive effect of the presence of the alcohol on the porous characteristics of the above amorphous alumino-silicates has also been verified by adding an alcohol, preferably ethanol, to the reaction mixture, in a quantity of up to a maximum of the molar ratio between alcohol added and $SiO_2$ equal to 8/1. It is important to note that the presence of the alcohol makes the reaction mixture homogeneous right from the beginning. Under these conditions, the hydrolysis and gelification rate is much higher than under heterogeneous conditions. In addition, the gelification can also take place at temperatures lower than the boiling point of the alcohols produced by the hydrolysis of the reagents, even at room temperature, with times not necessarily greater than those used in the similar process carried out at 60° C. in a heterogeneous phase.

Patent application WO 91/11390 describes the possibility of obtaining a new class of mesoporous alumino-silicates (called MCM-41) having an average pore diameter of between 20 Å and 100 Å and regularly organized in the material with a hexagonal or cubic structure.

These materials can be prepared starting from a mixture containing at least one silica source, one alumina source, an organic compound with the formula $R_1R_2R_3R_4N$—OH wherein, at least one among $R_1$, $R_2$, $R_3$ and $R_4$, represents an aryl or alkyl group with a long chain and each of the rest of $R_1$, $R_2$, $R_3$ and $R_4$, is selected from hydrogen and an alkyl group with a short chain and, possibly, a quaternary ammonium base having the above formula $R_1R_2R_3R_4N$—OH wherein, however, $R_1$, $R_2$, $R_3$ and $R_4$ are selected from hydrogen and a $C_1$–$C_5$ alkyl group or, two from alkyl groups, can be considered as jointly forming a cyclic compound. The mixture is subjected to hydrothermal treatment at a temperature of between 25° C. and 250° C. for a period of between 5 minutes and 14 days. The product obtained is characterized by an X-ray powder diffraction spectrum (XRD) which leads to a hexagonal structure with a bidimensional order or a structure with cubic symmetry. Tests carried out with high resolution transmission electron microscopy (HREM) show, in the case of mesoporous alumino-silicates (called MCM-41), a-hexagonal symmetry, the presence of monodimensional mesoporosity regularly organized according to a hexagonal honeycomb structure. In these materials the aluminium is in tetrahedral co-ordination giving the material acidity. In addition, these materials are very stable to thermal treatment.

SUMMARY OF THE INVENTION

The Applicant has now surprisingly found that, by means of a process deriving from that described in Italian patent application MI 93 A 002696 for the preparation of amorphous alumino-silicates and which is much easier than that disclosed in patent application WO 91/11390 for the preparation of mesoporous alumino-silicates (called MCM-41), it is possible to produce micro-mesoporous metal-silicates characterized by a narrow pore-size distribution and with a partial order of the pores. In fact, whereas the aluminosilicates obtained with the process described in the above Italian patent application are completely amorphous, these new materials, called ERS-8, are characterized by the presence of a broad reflection in the low angular region of the X-ray powder diffraction pattern, indicating a short-range order of the mesoporous structure. The existence of a short-range structural order enables this class of materials to be identified as intermediates among similar ordered materials (MCM-41) and completely disordered materials (amorphous alumino-silicates).

The present invention therefore relates to a micro-mesoporous gel consisting of a silica matrix in which one or more metal oxides are possibly uniformly dispersed, wherein the metals are selected from transition metals or metals belonging to groups IIA, IVA and VA, characterized by a monomodal distribution of the porosity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The X-ray powder diffraction spectrum (XRD) of the micro-mesoporous metal-silica gel (called ERS-8) of the present invention, recorded with a Philips vertical diffractometer, equipped with a pulse-height analyzer and divergent and receiving slits of ⅙° and with CuKα radiation ($\lambda=1.54178$ Å), is characterized by the presence of a single enlarged diffraction line, or in any case by a widespread scattering, at angular values not higher than 2 θ=5° (FIG. 1), whereas other coherent scattering phenomena are not observed for higher angular values. This can be interpreted with the presence of a short-range order of the mesoporous structure, with a structural correlation basically limited to only the first neighbours.

The micro-mesoporous metal-silica gel of the present invention is also characterized by a surface area of between 500 m$^2$/g and 1200 m$^2$/g, determined with the B.E.T. method by means of adsorption-desorption cycles of N$_2$ at the temperature of liquid nitrogen (77K) using a Carlo Erba Sorptomatic 1900 instrument, and a pore volume of between 0.3 cm$^3$/g and 1.3 cm$^3$/g. The pore diameter is less than 40 Å. Using the terms suggested by IUPAC "Manual of Symbols and Terminology" (1972), Appendix 2, Part I Coll. Surface Chem. Pure Appl. Chem., Vol. 31, page 578, which defines micropores as pores with a diameter of less than 20 Å and mesopores as pores with a diameter of between 20 Å and 500 Å, the metal-silica gel of the present invention can be classified as a micro-mesoporous solid.

Figure 17:
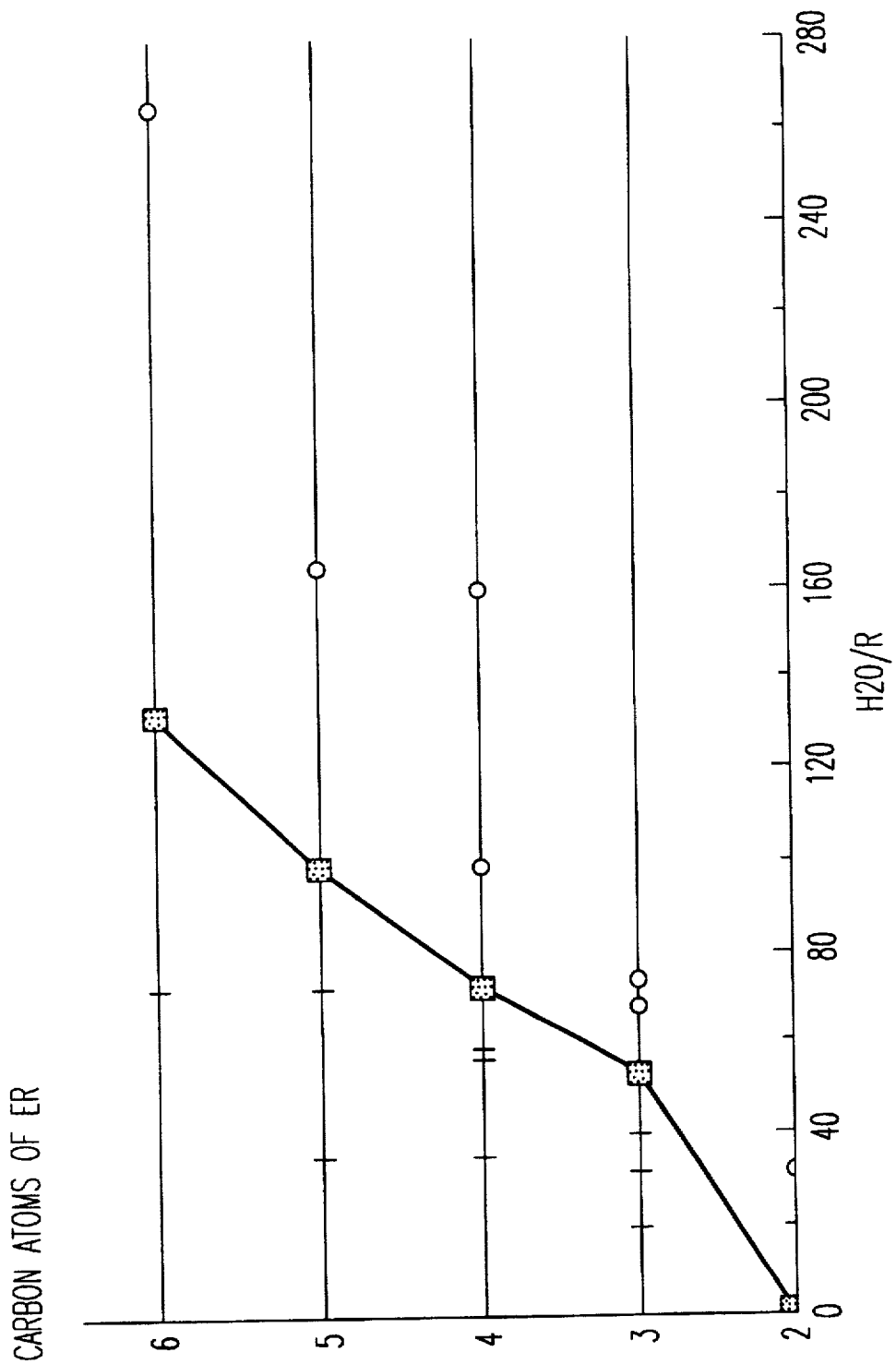
FIG. 17 graphically depicts the data in Table 1.

A process for the preparation of the micro-mesoporous metal-silica gel of the present invention comprises:

(a) subjecting to hydrolysis and gelification a solution of a tetra-alkyl orthosilicate in alcohol with an aqueous solution of a hydroxide of tetraalkylammonium having the formula (I):

$$R'_4N\text{—}OH \qquad (I)$$

wherein R' represents a C$_3$–C$_7$ alkyl group and, possibly, of one or more soluble or hydrolizable compounds of one or more metals whose oxides have a catalytic activity selected from transition metals or metals belonging to groups IIIA, IVA and VA;

The quantity of the constituents of the above solution being such as to respect the following molar ratios:
H$_2$O/SiO$_2$=5–30;
R-OH/SiO$_2$=5–10;
R'$_4$N$^+$/SiO$_2$=0.05–0.5;
metal oxides/SiO$_2$=0–0.05;

whereas the ratio H$_2$O/R'$_4$N$^+$ varies according to the number of carbon atoms in the R' alkyl chain, in accordance with the values shown in Table 1 below and in the graph of FIG. 17;

TABLE 1

| R' | H$_2$O/R$_4$'N$^+$ |
|---|---|
| THexylA-OH | ≦133 |
| TPentylA-OH | ≦100 |
| TButylA-OH | ≦73 |
| TPropylA-OH | ≦53 | operating at a temperature close to the boiling point, at atmospheric pressure, of the alcohol used in the solution of tetra-alkyl orthosilicate and of any alcohol which develops as by-product of the above hydrolysis reaction, without the elimination or substantial elimination of said alcohols from the reaction environment, preferably at a temperature of between 20° C. and 80° C.;

(b) subjecting the gel obtained in step (a) to drying and calcination.

The tetra-alkyl orthosilicate which can be used for the purposes of the present invention is selected from tetramethyl-, tetraethyl-, tetrapropyl-, tetraisopropylorthosilicate and among these tetraethylorthosilicate (TES) is preferred. The alcohol used for dissolving the above tetra-alkyl orthosilicate is, preferably, ethanol (EtOH).

The soluble or hydrolizable compounds of one or more metals whose oxides have a catalytic activity which can be used for the purposes of the present invention, are selected from the hydrosoluble or hydrolizable salts or acids of the metals themselves. Among these, aluminium tripropoxide and triisopropoxide and tetraothylorthotitanate are preferred.

The hydroxide of tetra-alkylammonium having formula (I) which can be used for the purpose of the present invention is selected from tatrapropyl-, tetraisopropyl-, tetrabutyl-, tetraisobuty-, tetraterbutyl-, tetrapentyl-, tetrahexyl- and tetraheptylammonium hydroxide and among these, tetrapropyl-, (TPropylA-OH), tetrabutyl- (TButylA-OH), tetrapentyl-(TPentylA-OH) and tetrahexylammonium hydroxide (THexylA-OH) are preferred.

In carrying out step (a) of the above process, an aqueous solution of tetra-alkylammonium hydroxide having formula (I) is first prepared and, possibly, of one or more soluble or hydrolizable compounds of one or more metals, to which, after the complete dissolution of the metal compound or compounds, if present, the alcohol solution of tetra-alkyl orthosilicate is subsequently added. After this addition, an increase in the viscosity of the reagent mixture is observed, the rate depending directly on the temperature and composition of the mixture itself, until a gel is formed. The gelification process is completed in a time of between 1 minute and 3 hours. The same gel can be subjected to aging for a time of between 1 and 72 hours, at a temperature of between 20° C. and 80° C.

In step (b) of the above process, the gel obtained in step (a) is dried at a temperature of between 60° C. the and 150° C. under vacuum and is finally calcinated in air at a temperature of between 450° C. and 550° C. for 6–12 hours.

The metal-silica gel of the present invention can be conveniently used as a heterogeneous catalyst, as an absorbent or as a catalyst support in industrial processes in the fields of oil-refinery, petrolchemistry, base chemistry and fine chemistry.

The following examples which provide a better understanding of the present invention and its practical embodiment, are illustrative but do not limit the scope of the invention in any way.

EXAMPLE 1

Gelification with tetrapentylammonium hydroxide (TPentylA-OH) in an open thermostat-regulated system.

24.4 g of TPentylA-OH (aqueous solution at 36% by weight), 20.6 g of water and 2.04 g of aluminium isopropoxide are mixed, at about 60° C., in a 400 cm$^3$ laboratory beaker. When the aluminium salt has completely dissolved, the beaker is placed in a heating bath thermostat-regulated at 40° C. When this temperature has been reached, under vigorous stirring, a solution consisting of 52 g of tetraethylorthosilicate (TES) in 100 g of ethanol (EtOH) is added. The composition of the mixture, expressed as molar ratios, is the following:
$Al_2O_3/SiO_2=0.02$;
$TPentylA-OH/SiO_2=0.11$;
$H_2O/SiO_2=8$;
$EtOH/SiO_2=9$;
$H_2O/TPentylA-OH=73$.

After about 35 minutes of stirring, a transparent gel is formed which is left to age for about 20 hours, is then dried in an oven at 120° C. under vacuum and finally calcined at 550° C. for 8 hours in air.

Figure 1:
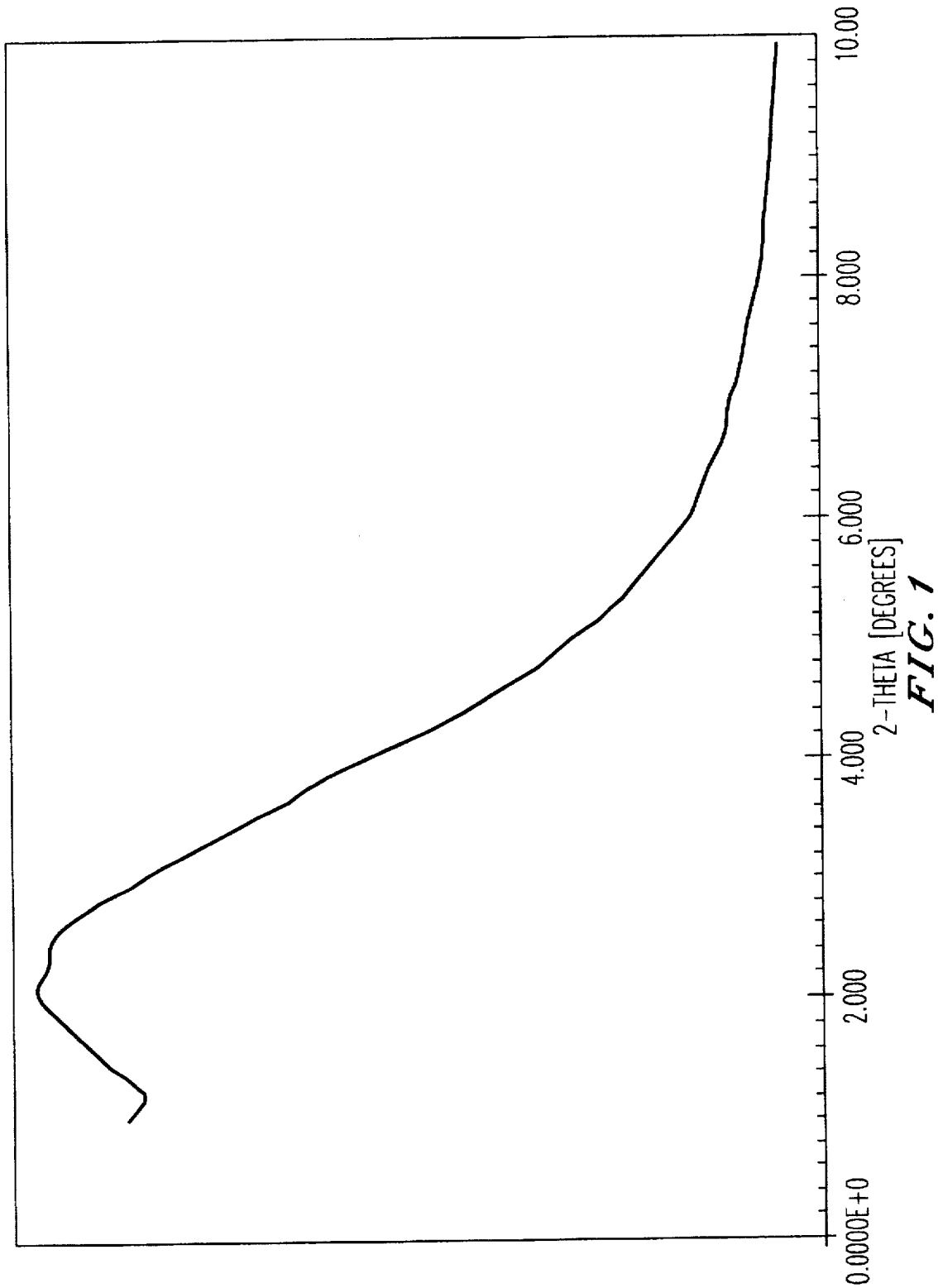
FIG. 1 depicts the X-ray powder diffraction spectrum of the micro-mesoporous metal-silica gel of the present invention.
Figure 2:
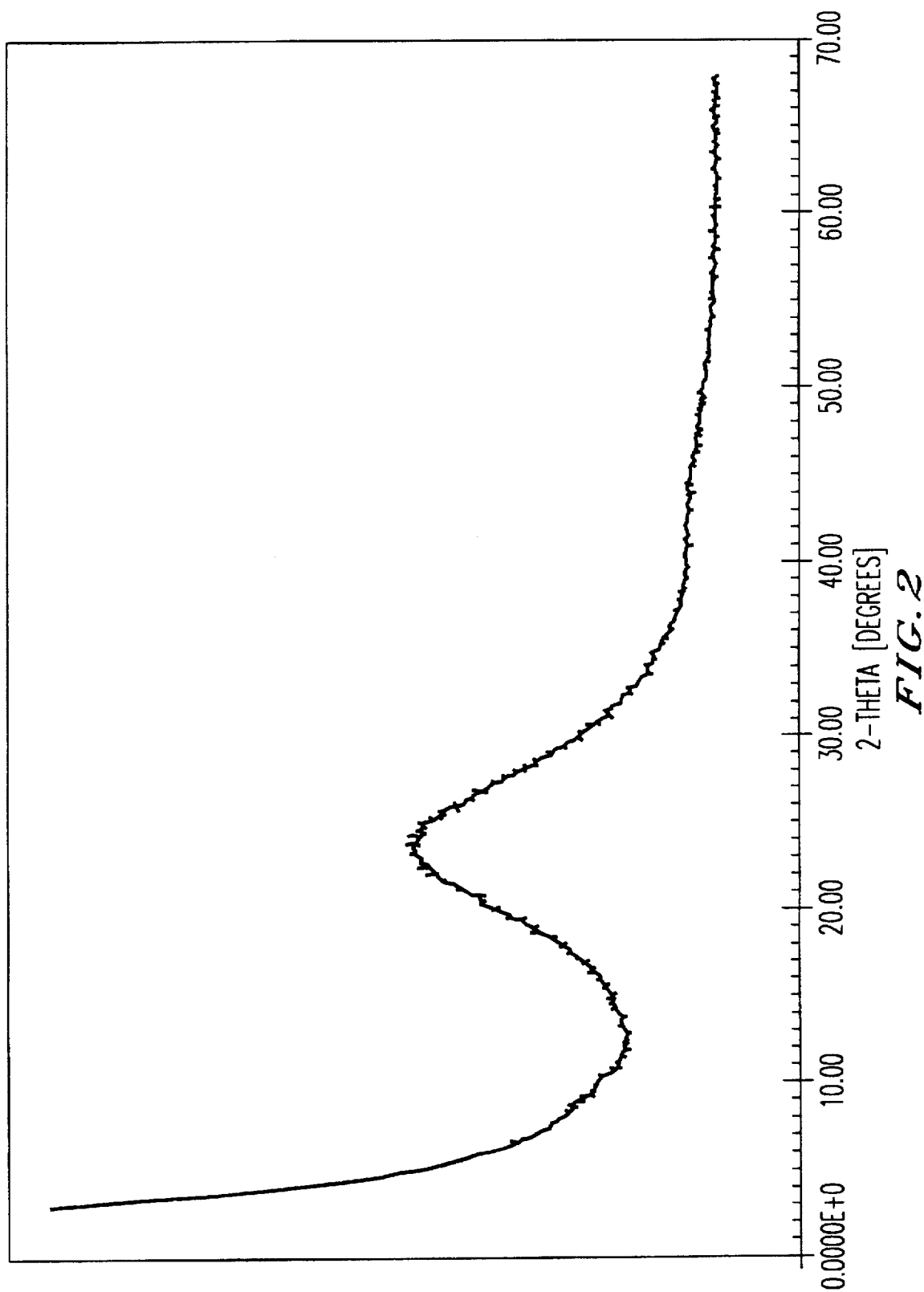
FIG. 2 depicts an X-ray powder diffraction spectrum.

The XRD spectrum shows the presence of a weak and broad reflection centred at 2 θ=2.1° (d=42.1 Å) (FIG. 1). The specific surface area proves to be 752 m$^2$/g, the specific pore volume 0.396 cm$^3$/g, with a pore diameter of less than 40 Å.

EXAMPLE 2

Gelification with tetrabutylammonium hydroxide (TButylA-OH) in a reflux system.

37.8 g of TButylA-OH (aqueous solution at 19% by weight), 5.5 g of water and 2.04 g of aluminium isopropoxide are mixed, at about 60° C., in a 3-necked 500 cm$^3$ flask, equipped with a mechanical stirrer, reflux cooler and thermometer. When the complete dissolution of the aluminium salt has been obtained, the temperature is raised to about 70° C. and a solution of 52 g of tetraethylorthosilicate (TES) in 100 g of ethanol (EtOH) is then added, under vigorous mechanical stirring. The composition of the mixture, expressed as molar ratios, is the following:
$Al_2O_3/SiO_2=0.02$;
$TButylA-OH/SiO_2=0.11$;
$H_2O/SiO_2=8$;
$EtOH/SiO_2=9$;
$H_2O/TButylA-OH=73$.

The gelification process, completed after about 3 minutes, produces a compact gel which is difficult to stir. The addition of a further 50 g of ethanol (EtOH) makes the gel more fluid and enables it to be subjected to mechanical stirring which is prolonged for 20 hours operating at the boiling point of the ethanol (78° C.). The high viscosity product thus obtained is then dried in an oven at 120° C. under vacuum and finally calcined in air at 550° C. for 8 hours.

Figure 3:
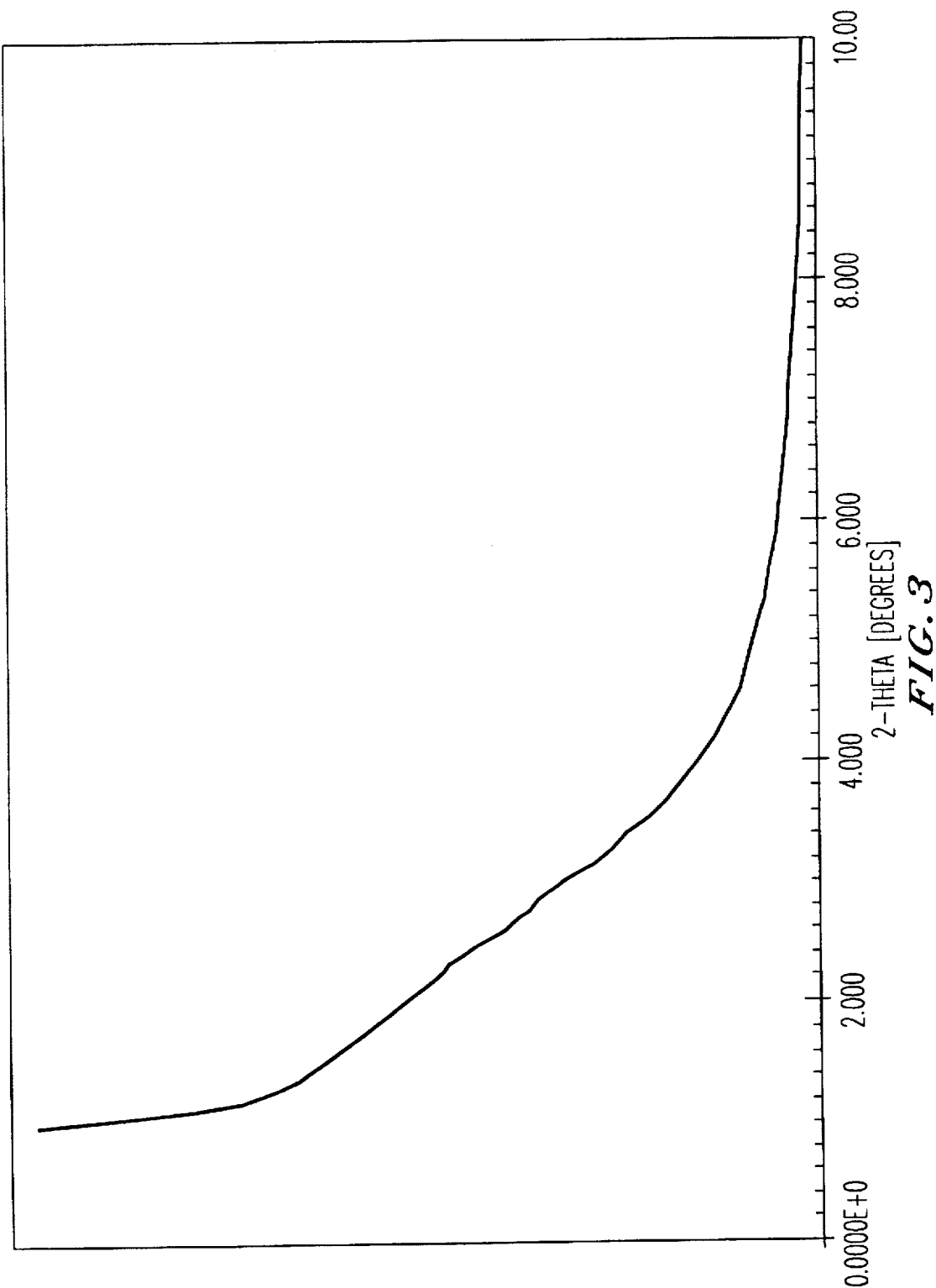
FIG. 3–FIG. 16, depict X-ray diffraction spectra according to Examples 2, 3, and 5–16.

The XRD spectrum shows the presence of a weak and broad scattering in the angular region at 2θ of between 1° and 4° (FIG. 3). The specific surface area proves to be 985 m$^2$/g, the specific pore volume 0.643 cm$^3$/g, with a pore diameter of less than 40 Å.

EXAMPLE 3

Gelification with tetrabutylammonium hydroxide (TButylA-OH) in an open system.

37.8 g of TButylA-OH (aqueous solution at 19% by weight), 5.5 g of water and 2.04 g of aluminium isopropoxide are mixed, at about 60° C., in a 400 cm$^3$ laboratory beaker. When the aluminium salt has completely dissolved, the heating is interrupted and a solution consisting of 52 g of tetraethylorthosilicate (TES) in 100 g of ethanol (EtOH) is added, under stirring.

The composition of the mixture, expressed as molar ratios, is the following:
$Al_2O_3/SiO_2=0.02$;
$TButylA-OH/SiO_2=0.11$;
$H_2O/SiO_2=8$;
$EtOH/SiO_2=9$;
$H_2O/TButylA-OH=73$.

After about 12 minutes of stirring, a transparent gel is formed which is left to age for about 20 hours, is then dried in an oven at 120° C. under vacuum and finally calcined at 550° C. for 8 hours in air.

Figure 4:
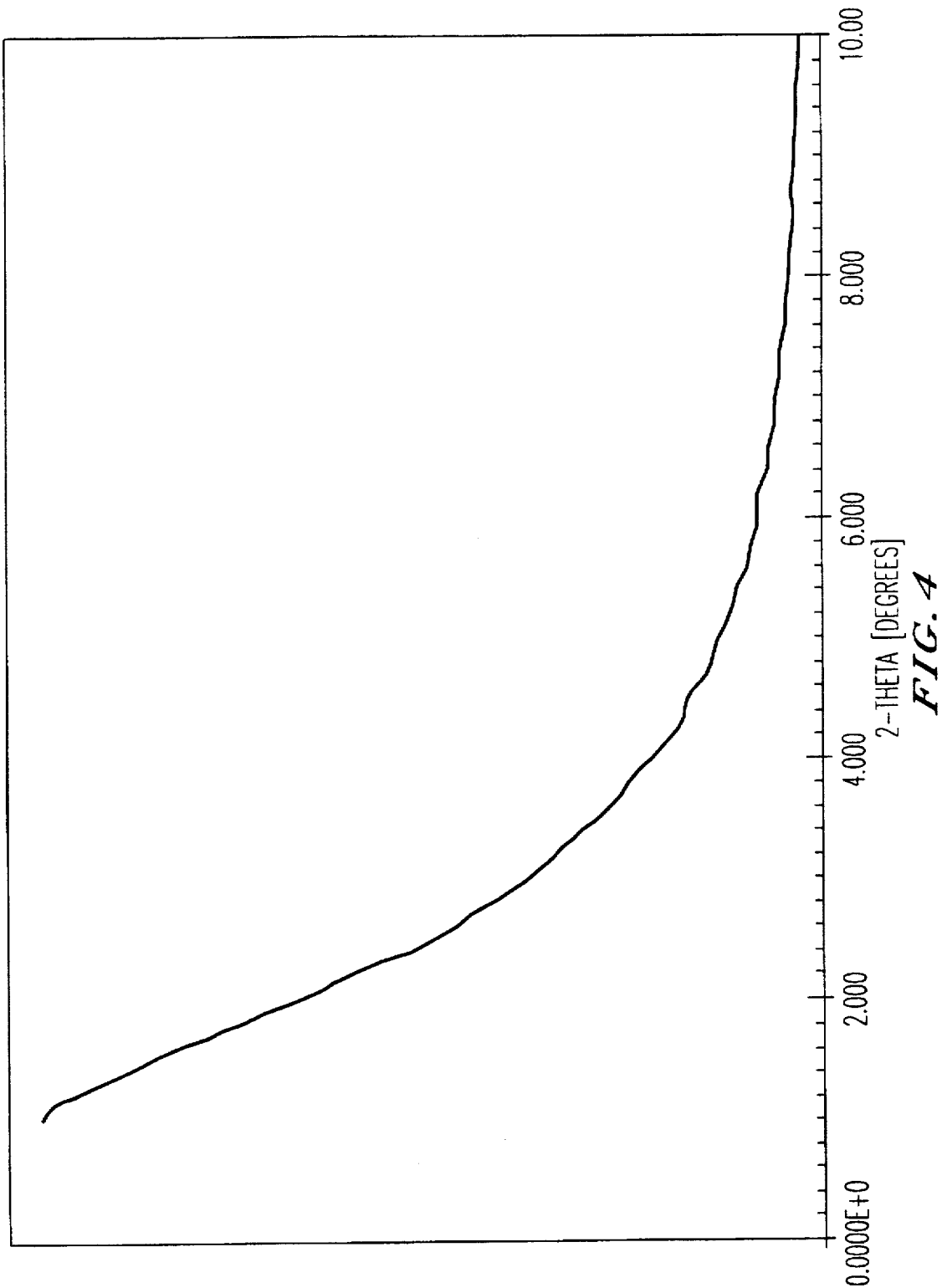

The XRD spectrum shows the presence of a weak and broad scattering in the lower angular region (FIG. 4).

The specific surface area, measured with the B.E.T. method, is equal to 576 m$^2$/g, the specific pore volume 0.336 cm$^3$/g. The material is characterized by the presence of pores with a diameter of less than 30 Å.

EXAMPLE 4

Gelification with tetrapentylammonium hydroxide (TPentylA-OH) in a thermostat-regulated open system.

The preparation is identical to that described in example 3 with the exception that the gelification temperature is brought to 60° C.

The XRD spectrum is completely similar to that of the material described in example 3 (FIG. 4).

EXAMPLE 5
Gelification with tetrapentylammonium hydroxide (TPentylA-OH) in a reflux system.

24.4 g of TPentylA-OH (aqueous solution at 36% by weight), 20.6 g of water and 2.04 g of aluminium isopropoxide are mixed, at about 60° C., in a 3-necked 500 cm$^3$ flask, equipped with a mechanical stirrer, reflux cooler and thermometer. When the complete dissolution of the aluminium salt has been obtained, the temperature is raised to 70° C. and the solution consisting of 52 g of tetraethylorthosilicate (TES) in 100 g of ethanol (EtOH) is added. The composition of the mixture, expressed as molar ratios, is the following:

$Al_2O_3/SiO_2$=0.02;
TPentylA-OH/$SiO_2$=0.11;
$H_2O/SiO_2$=8;
EtOH/$SiO_2$=9;
$H_2O$/TPentylA-OH=73.

After about 10 minutes, there is the formation of a viscous mass which is maintained under stirring for 20 hours at the boiling point of the ethanol (78° C.), obtaining a gel which is concentrated in a rotavapour, then dried in an oven at 120° C. under vacuum and finally calcined in air at 550° C. for 8 hours.

Figure 5:
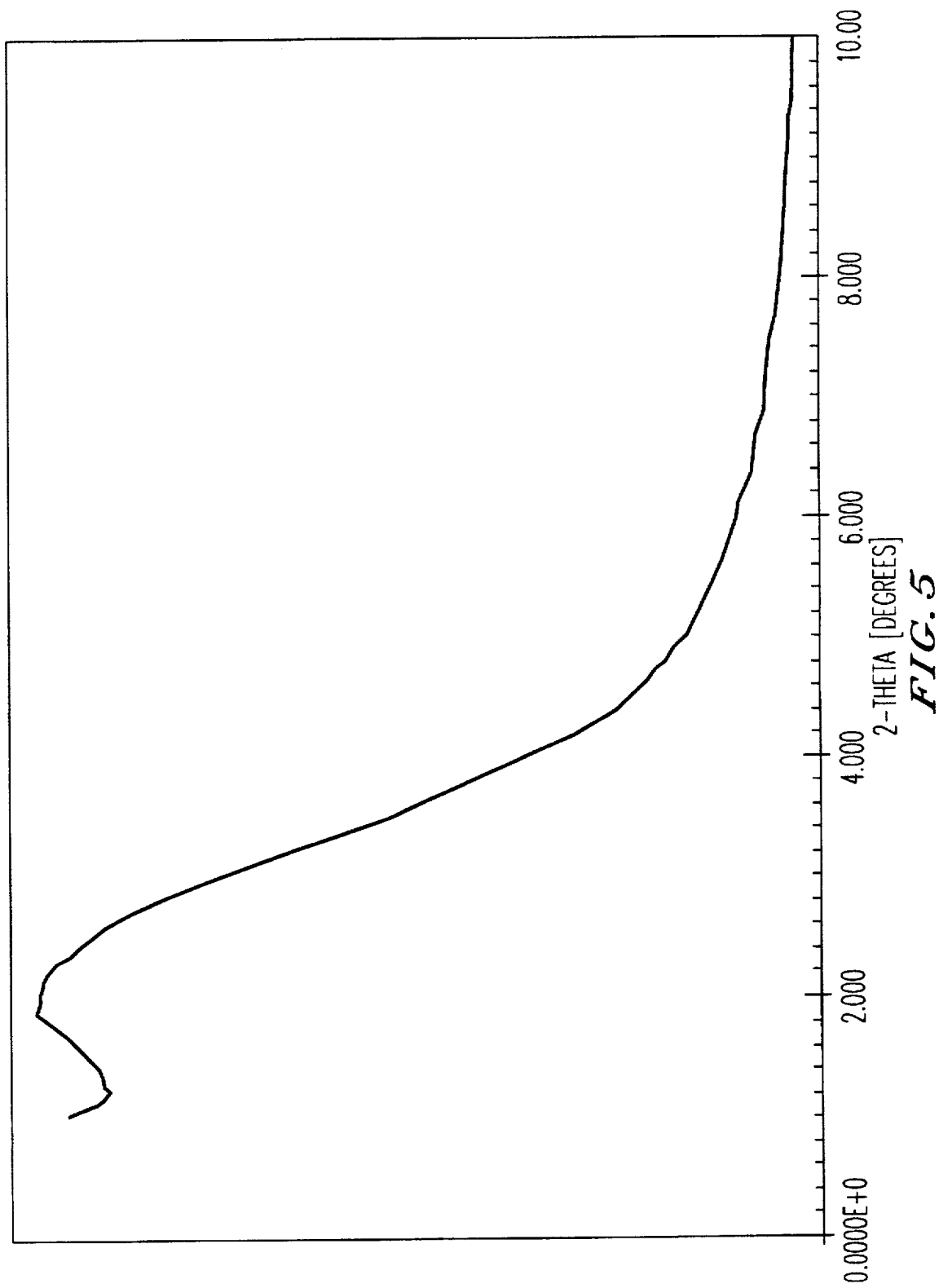

The XRD spectrum, shown in FIG. 5, indicates the presence of a weak and broad reflection centred at 2θ=1.95 (d=45.4 Å). The specific surface area proves to be 911 m$^2$/g, the specific pore volume 0.447 cm$^3$/g, with a diameter of less than 30 Å.

EXAMPLE 6
Gelification with tetrahexylammonium hydroxide (THexylA-OH) in an open system.

34.5 g of THexylA-OH (aqueous solution at 29.9% by weight), 12 g of water and 2.04 g of aluminium isopropoxide are mixed, at about 60° C., in a 400 cm$^3$ laboratory beaker. When the aluminium salt has completely dissolved, the solution is brought to room temperature and a solution of 52 g of tetraethylorthosilicate (TES) in 100 g of ethanol (EtOH) is added. The composition of the mixture, expressed as molar ratios, is the following:

$Al_2O_3/SiO_2$=0.02;
THexylA-OH/$SiO_2$=0.11;
$H_2O/SiO_2$=8;
EtOH/$SiO_2$=9;
$H_2O$/THexylA-OH=73.

After about 120 minutes of stirring, a transparent gel is formed which is left to age for about 20 hours, is then dried in an oven at 120° C. under vacuum and finally calcined at 550° C. for 8 hours in air.

Figure 6:
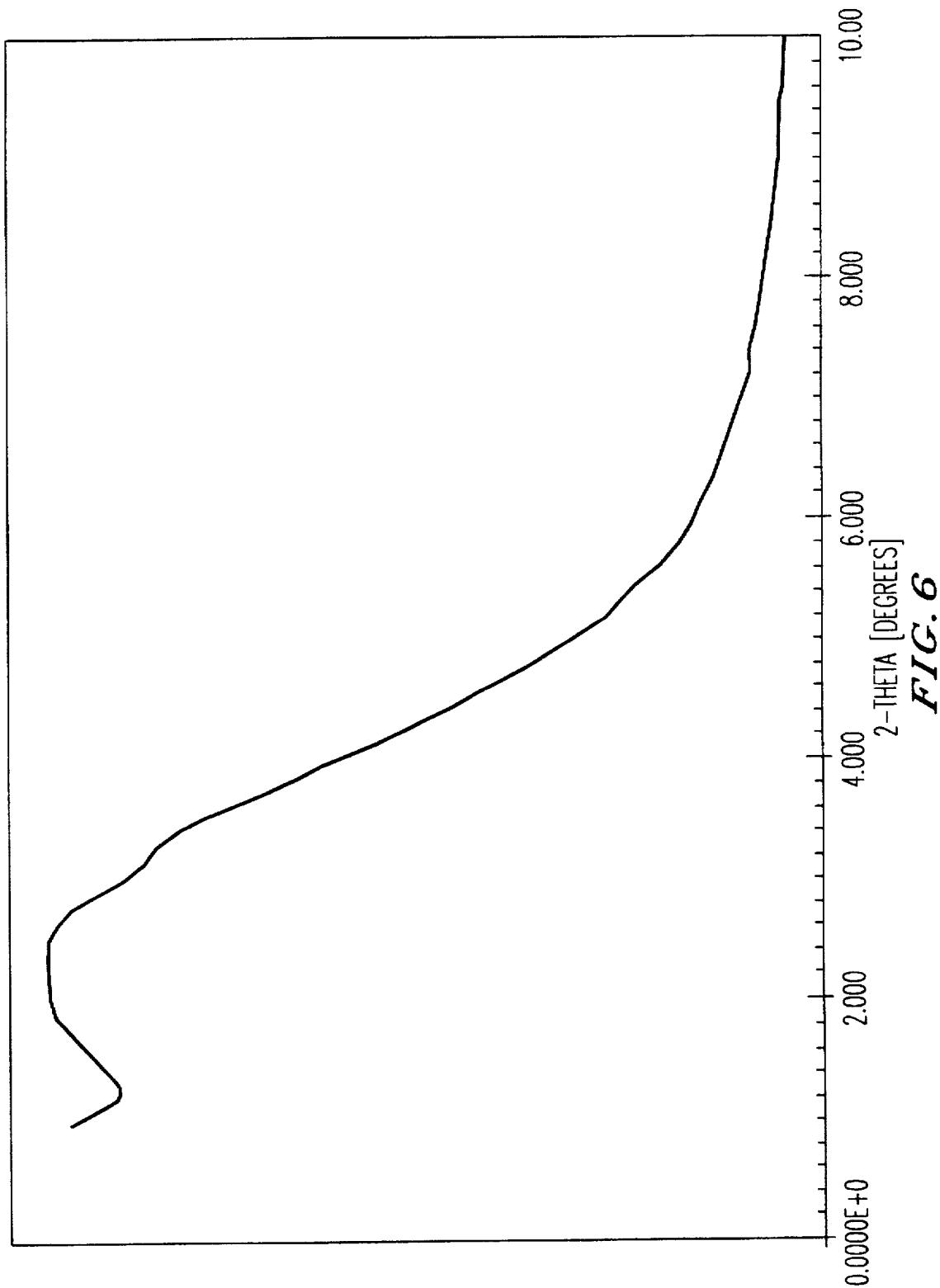

The XRD spectrum shows the presence of a weak and enlarged reflection centred at 2θ=2.2° (d=40.2 Å) (FIG. 6). The specific surface area is equal to 875 m$^2$/g, the specific pore volume 0.435 cm$^3$/g, with a diameter of less than 30 Å.

EXAMPLE 7
Gelification with tetrahexylammonium hydroxide (THexylA-OH) in a reflux system.

34.5 g of THexylA-OH (aqueous solution at 36% by weight), 12 g of water and 2.04 g of aluminium isopropoxide are mixed, at about 60° C., in a 3-necked 500 cm$^3$ flask, equipped with a mechanical stirrer, reflux cooler and thermometer. When the complete dissolution of the aluminium salt has been obtained, the temperature is raised to 70° C. and the solution consisting of 52 g of tetraethylorthosilicate (TES) in 100 g of ethanol (EtOH) is added. The composition of the mixture, expressed as molar ratios, is the following:

$Al_2O_3/SiO_2$=0.02;
THexylA-OH/$SiO_2$=0.11;
$H_2O/SiO_2$=8;
EtOH/$SiO_2$=9;
$H_2O$/THexylA-OH=73.

The mixture, left under stirring for 20 hours at the boiling point of the ethanol (78° C.), undergoes only a slight increase in viscosity, without however the formation of a gel or precipitates. The product obtained is then concentrated in a rotavapour, dried in an oven at 120° C. under vacuum and finally calcined in air at 550° C. for 8 hours.

Figure 7:
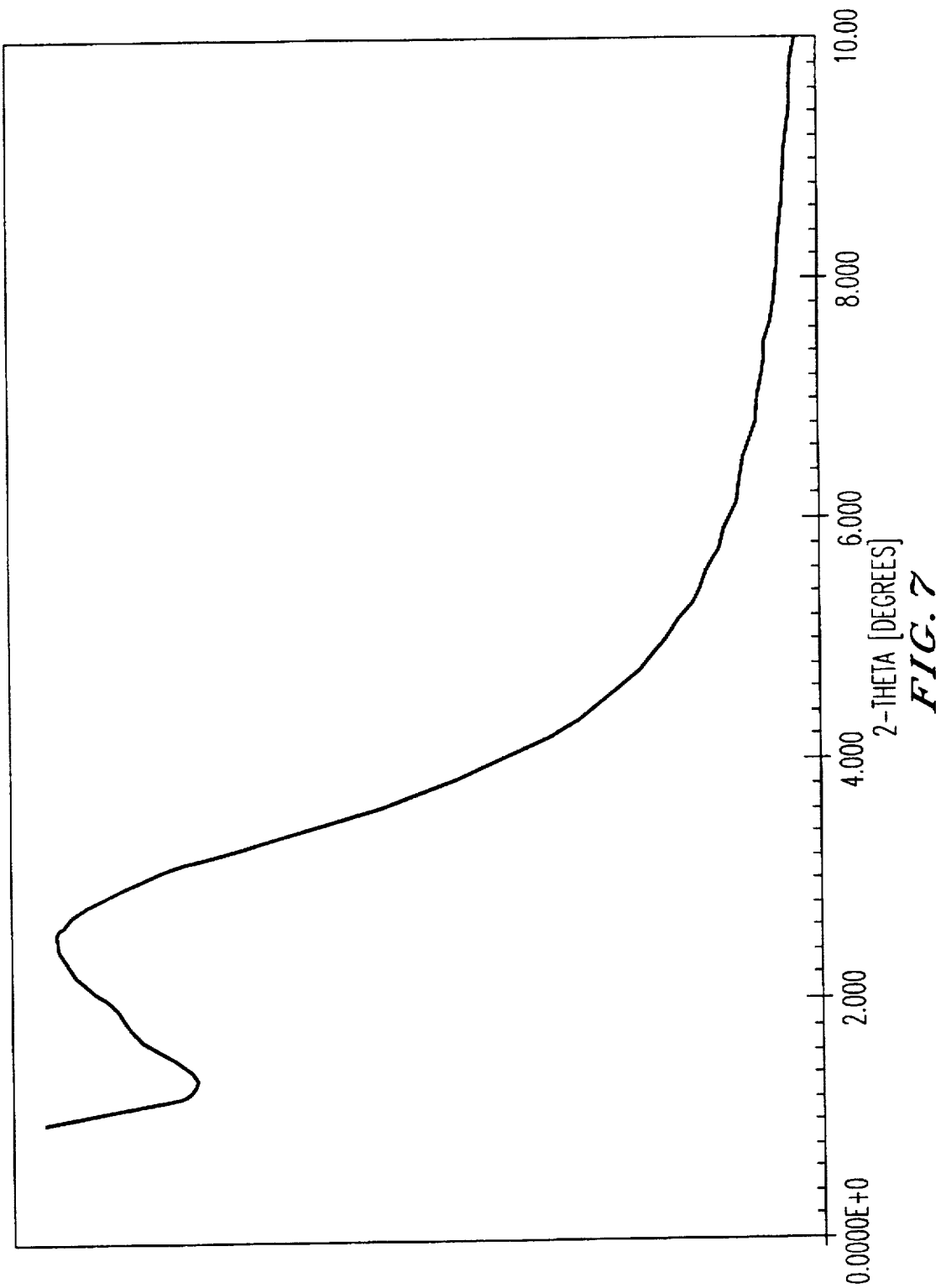

The XRD spectrum shows the presence of a weak and broad reflection centred at 2θ=2.5 (d=35.3 Å) (FIG. 7). The specific surface area proves to be 970 m$^2$/g, the specific pore volume 0.490 cm$^3$/g, with a diameter of less than 30 Å.

EXAMPLE 8
Gelification with tetrapropylammonium hydroxide (TPropylA-OH) in an open system.

16 g of TPropylA-OH (aqueous solution at 47.5% by weight), 27.6 g of water and 1 g of aluminium isopropoxide are mixed, at about 60° C., in a 400 cm$^3$ laboratory beaker. When the aluminium salt has completely dissolved, the heating is interrupted and the solution consisting of 52 g of tetraethylorthosilicate (TES) in 100 g of ethanol (EtOH) is added, under stirring to the solution thus obtained. The composition of the mixture, expressed as molar ratios, is the following:

$Al_2O_3/SiO_2$=0.01;
TPropylA-OH/$SiO_2$=0.15;
$H_2O/SiO_2$=8;
EtOH/$SiO_2$=9;
$H_2O$/TPropylA-OH=53.

After about 20 minutes of stirring, a transparent gel is formed which is left to age until the following day, is then dried in an oven at 120° C. under vacuum and finally calcined at 550° C. for 8 hours in air.

Figure 8:
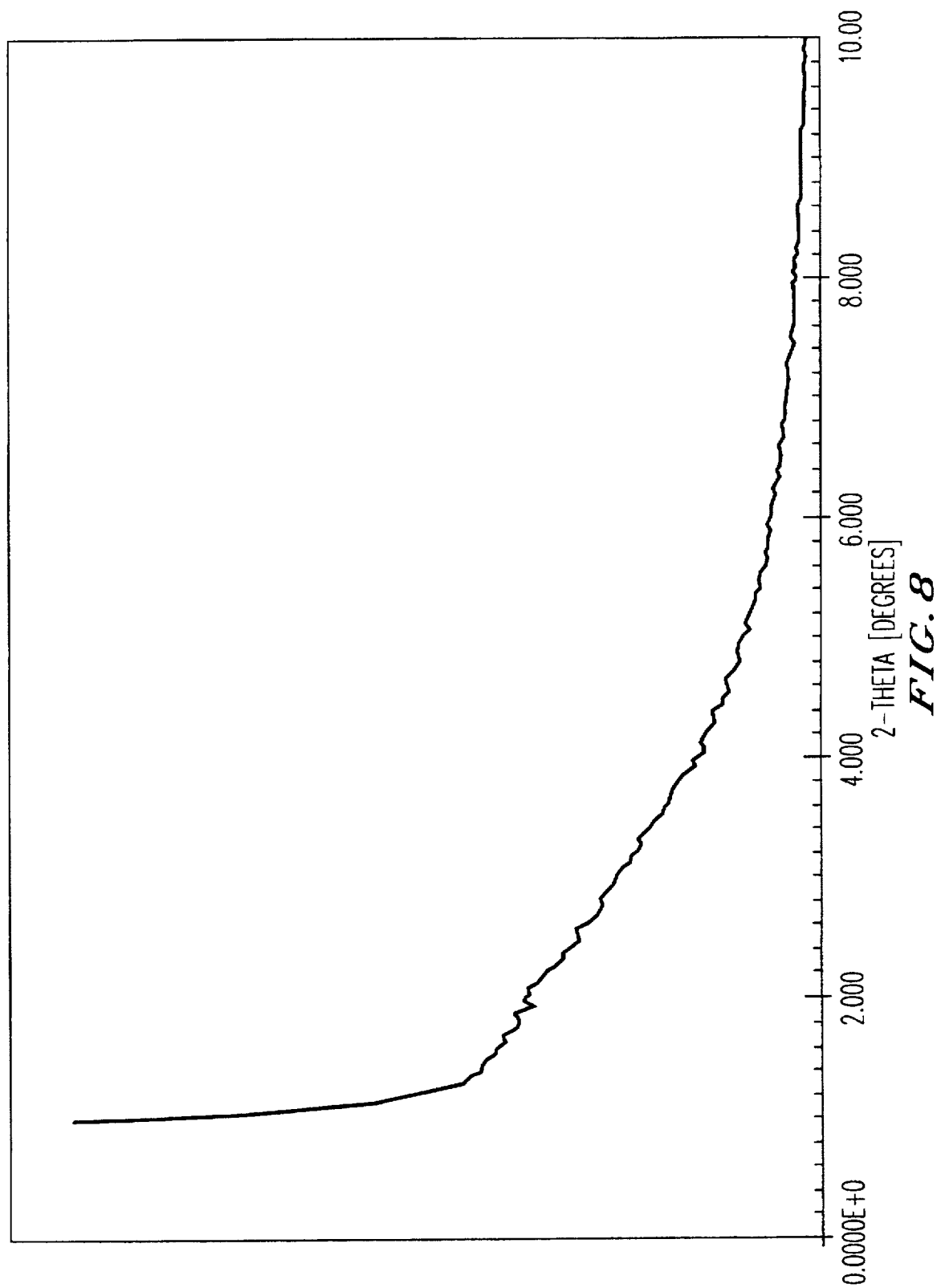

The XRD spectrum shows the presence of a widespread scattering in the angular region at 2θ of between 1° and 4° (FIG. 8). The specific surface area is equal to 588 m$^2$/g, the specific pore volume 0.413 cm$^3$/g, with a diameter of less than 40 Å.

EXAMPLE 9
Gelification with tetrahexylammonium hydroxide (THexylA_=H) in an open system.

18.6 g of THexylA-OH (aqueous solution at 20.1% by weight), 22 g of water and 2.04 g of aluminium isopropoxide are mixed, at about 60° C., in a 400 cm$^3$ laboratory beaker. When the aluminium salt has completely dissolved, the heating is interrupted and the solution consisting of 52 g of tetraethylorthosilicate (TES) in 100 g of ethanol (EtOH) is added, under stirring to the solution thus obtained. The composition of the mixture, expressed as molar ratios, is the following:

$Al_2O_3/SiO_2$=0.02;
THexylA-OH/$SiO_2$=0.06;
$H_2O/SiO_2$=8;
EtOH/$SiO_2$=9;
$H_2O$/THexylA-OH=133.

After about 140 minutes of stirring, a transparent gel is formed which is left to age until the following day, is then dried in an oven at 120° C. under vacuum and finally calcined at 550° C. for 8 hours in air.

Figure 9:
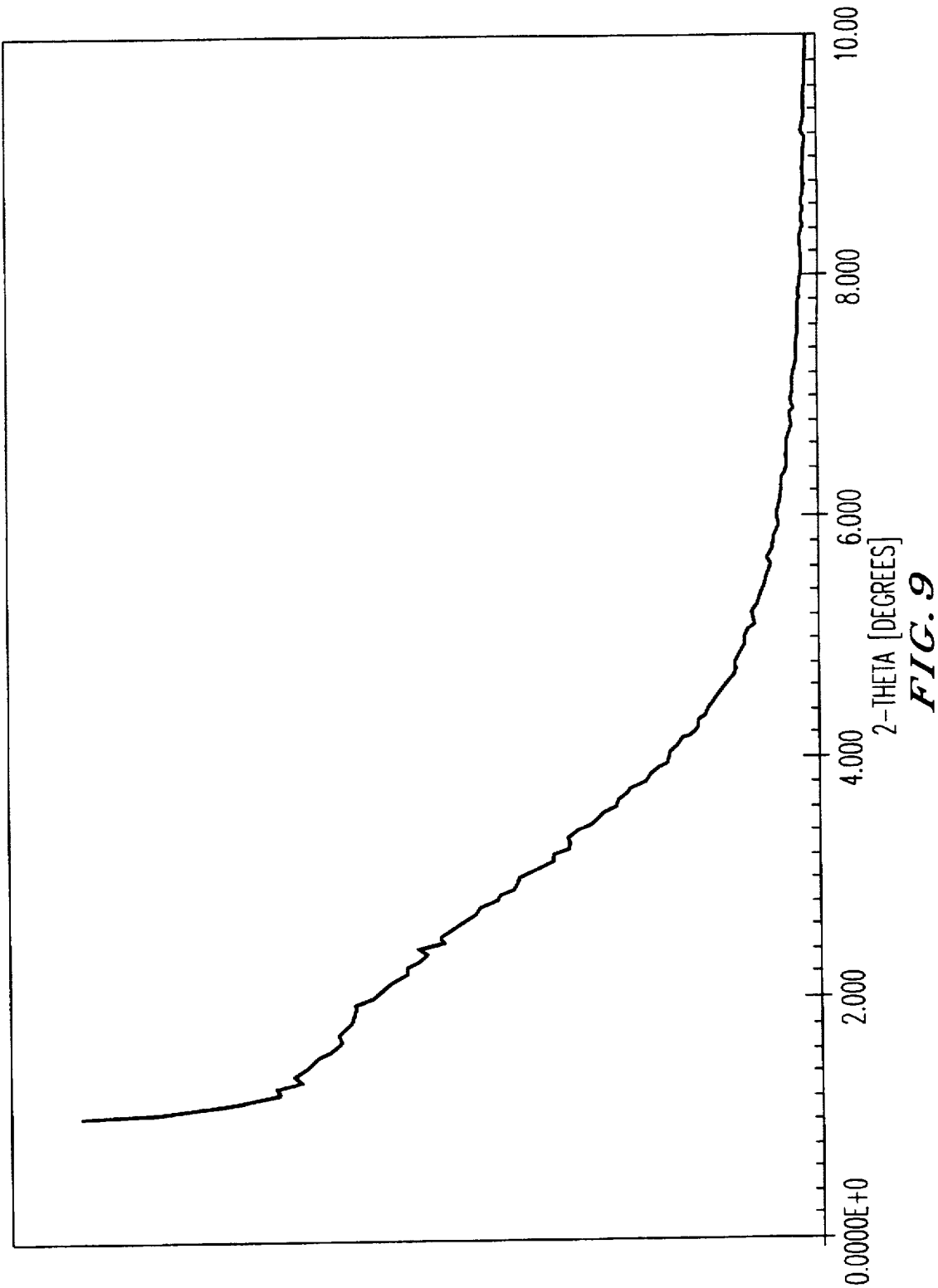

The XRD spectrum shows the presence of a widespread scattering in the angular region at 2θ of between 1° and 4° (FIG. 9). The specific surface area is equal to 965 m$^2$/g, the specific pore volume 0.520 cm$^3$/g, with a diameter of less than 30 Å.

EXAMPLE 10

Gelification with tetrapentylammonium hydroxide (TPentylA-=H) in an open system.

17.5 g of TPentylA-OH (aqueous solution at 36% by weight), 24.8 g of water and 1 g of aluminium isopropoxide are mixed, at about 60° C., in a 400 cm$^3$ laboratory beaker. When the aluminium salt has completely dissolved, the heating is interrupted and the solution consisting of 52 g of tetraethylorthosilicate (TES) in 100 g of ethanol (EtOH) is added, under stirring to the solution thus obtained. The composition of the mixture, expressed as molar ratios, is the following:

$Al_2O_3/SiO_2$=0.01;
TPentylA-OH/$SiO_2$=0.08;
$H_2O$/$SiO_2$=8;
EtOH/$SiO_2$=9;
$H_2O$/TPentylA-OH=100.

After about 40 minutes of stirring, a transparent gel is formed which is left to age until the following day, is then dried in an oven at 120° C. under vacuum and finally calcined at 550° C. for 8 hours in air.

Figure 10:
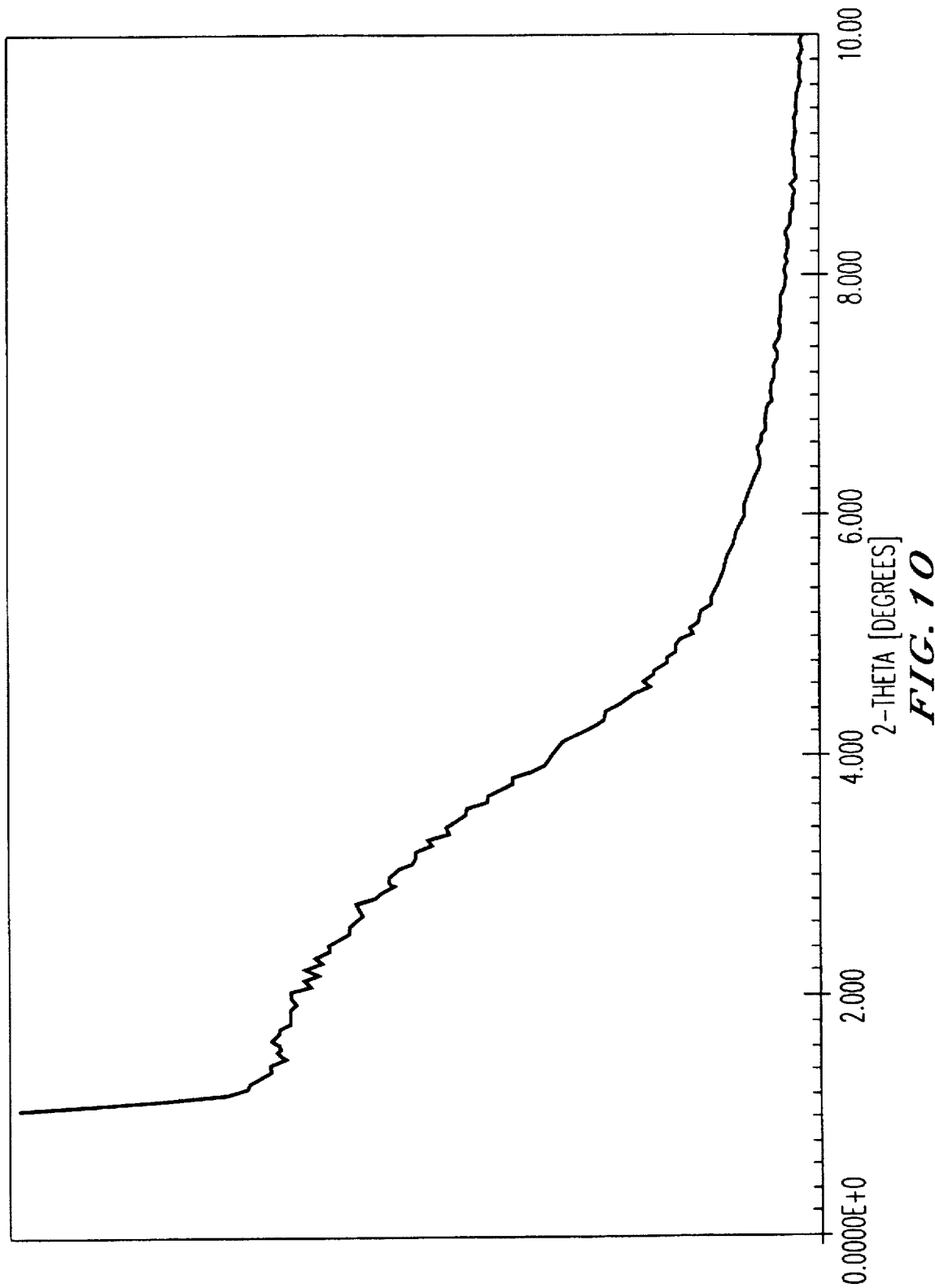

The XRD spectrum shows the presence of a widespread scattering in the angular region at 2θ of between 1° and 5° (FIG. 10). The specific surface area is equal to 843 m$^2$/g, the specific pore volume 0.447 cm$^3$/g, with a diameter of less than 40 Å.

EXAMPLE 11

Gelification with tetrapentylammonium hydroxide (TPentylA-OH) in an open system.

48.2 g of TPentylA-OH (aqueous solution at 36% by weight) and 5 g of water are mixed in a 400 cm$^3$ laboratory beaker. The solution consisting of 52 g of tetraethylorthosilicate (TES) in 100 g of ethanol (EtOH) is added, under stirring to the solution thus obtained. The composition of the mixture, expressed as molar ratios, is the following:

TPentylA-OH/$SiO_2$=0.22;
$H_2O$/$SiO_2$=8;
EtOH/$SiO_2$=9;
$H_2O$/TPentylA-OH=36.

After about 40 minutes of stirring, a slightly opaque gel is formed which is left to age until the following day, is then dried in an oven at 120° C. under vacuum and finally calcined at 550° C. for 8 hours in air.

Figure 11:
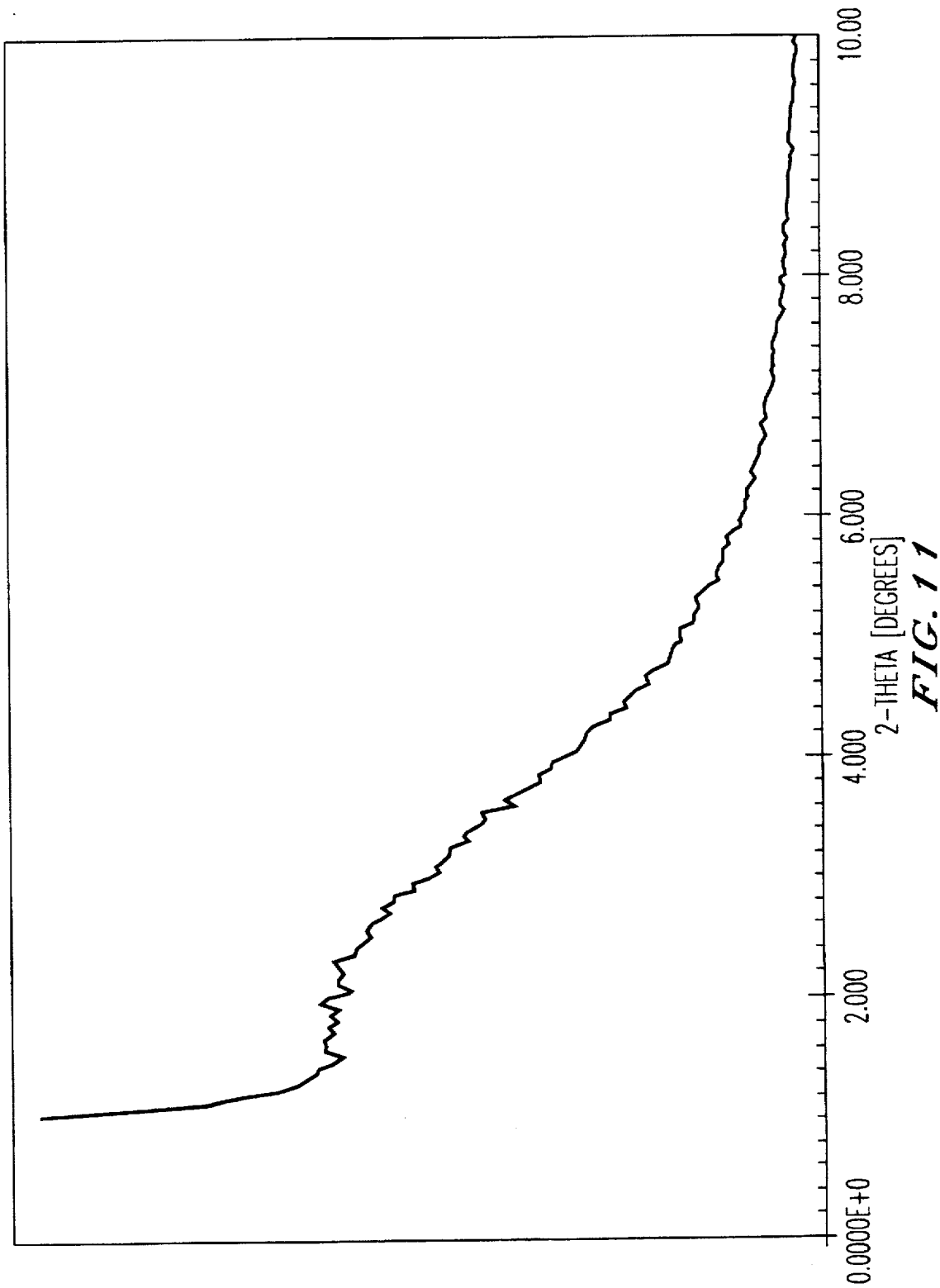

The XRD spectrum shows the presence of a widespread scattering in the angular region at 2θ of between 1° and 5° (FIG. 11). The specific surface area is equal to 565 m$^2$/g, the specific pore volume 0.284 cm$^3$/g, with a diameter of less than 40 Å.

EXAMPLE 12

Gelification with tetrapentylammonium hydroxide (TPentylA-OH) in an open system.

48.2 g of TPentylA-OH (aqueous solution at 36% by weight), 5.4 g of water and 2.25 g of tetraethylorthotitanate (TEOT) are mixed in a 400 cm$^3$ laboratory beaker. The solution consisting of 52 g of tetraethylorthosilicate (TES) in 100 g of ethanol (EtOH) is added, under stirring to the solution thus obtained. The composition of the mixture, expressed as molar ratios, is the following:

$SiO_2$/$TiO_2$=0.01;
TPentylA-OH/$SiO_2$=0.22;
$H_2O$/$SiO_2$=8;
EtOH/$SiO_2$=9;
$H_2O$/TPentylA-OH=36.

A transparent yellow liquid is obtained which is left to age until the following day, is then dried in a rotating evaporator under vacuum and finally calcined at 550° C. for 8 hours in air.

Figure 12:
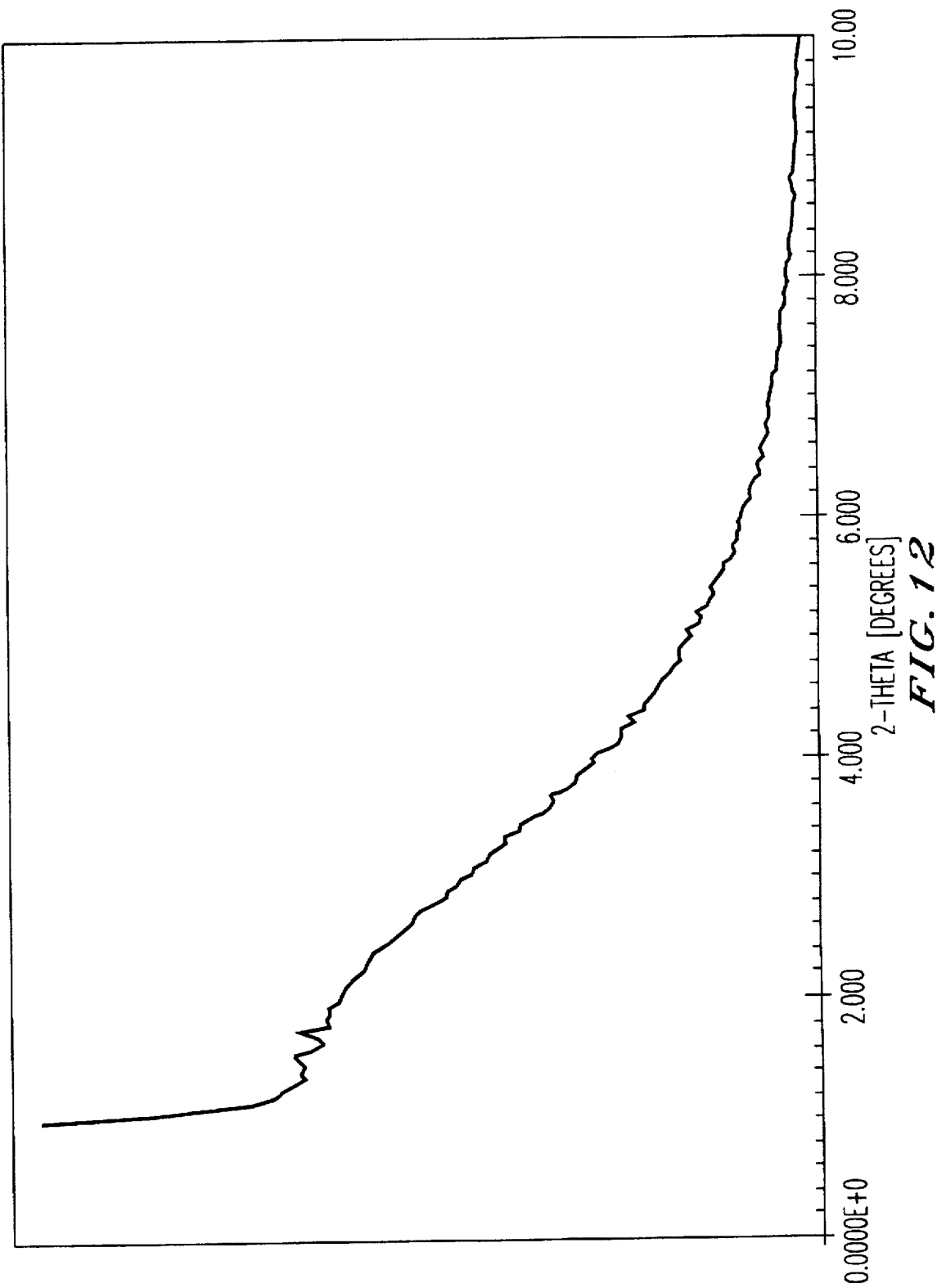

The XRD spectrum shows the presence of a widespread scattering in the angular region at 2θ of between 1° and 4° (FIG. 12). The specific surface area is equal to 835 m$^2$/g, the specific pore volume 0.426 cm$^3$/g, with a diameter of less than 30 Å.

EXAMPLE 13 (comparative)

Gelification with tetrapropylammonium hydroxide (TPropylA-OH) in an open system 65.25 g of TPropylA-OH (aqueous solution at 14% by weight) and 2.04 g of aluminium isopropoxide are mixed, at about 60° C., in a 800 cm$^3$ laboratory beaker. When the aluminium salt has completely dissolved, the system is brought to room temperature and a solution of 104 g of tetraethylorthosilicate (TES) in 184 g of ethanol (EtOH) is added, under vigorous stirring. The composition of the mixture, expressed as molar ratios, is the following:

$Al_2O_3$/$SiO_2$=0.01;
TPropylA-OH/$SiO_2$=0.09;
$H_2O$/$SiO_2$=6.2;
EtOH/$SiO_2$=8;
$H_2O$/TPropylA-OH=69.

After about 15 minutes, an opaque gel is formed which is left to age for about 20 hours, is then dried at 120° C. under vacuum and finally calcined at 550° C. for 8 hours in air.

Figure 13:
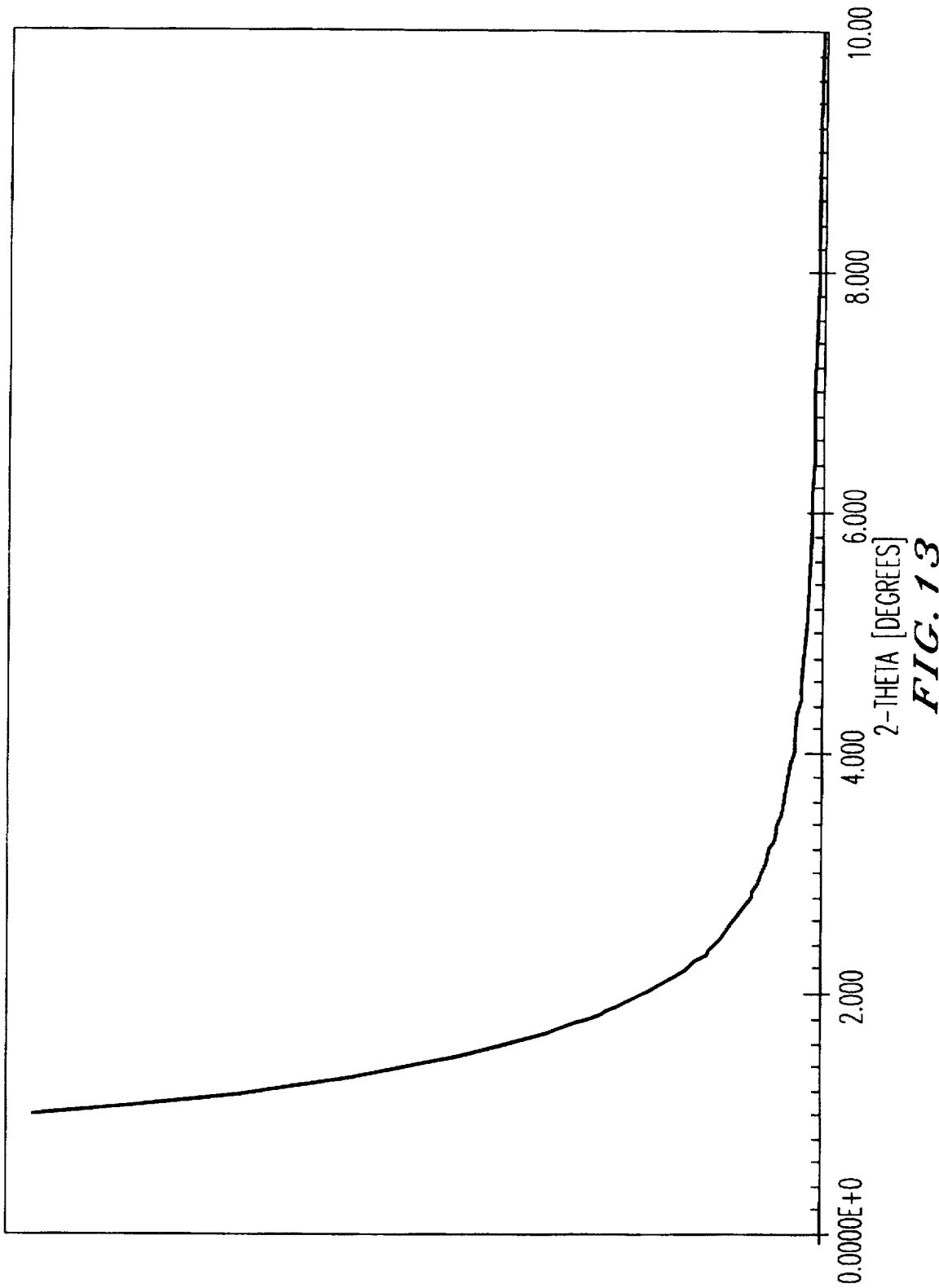

The XRD spectrum does not show significant scattering phenomena at low angles (FIG. 13), whereas the B.E.T. analysis shows a specific surface area of 656 m$^2$/g and a specific pore volume of 0.473 cm$^3$/g. The distribution of porosity is very narrow, mostly centred at values of 40 Å in diameter.

EXAMPLE 14 (comparative).

Gelification with tetraethylammonium hydroxide (TEthylA-=H) in an open system.

55.51 g of TEthylA-OH (aqueous solution at 35% by weight) and 1 g of aluminium isopropoxide are mixed in a 400 cm$^3$ laboratory beaker. When the aluminium salt has completely dissolved, the heating is interrupted and a solution of 52 g of tetraethylorthosilicate (TES) in 100 g of ethanol (EtOH) is added, under stirring to the solution thus obtained. The composition of the mixture, expressed as molar ratios, is the following:

$Al_2O_3$/$SiO_2$=0.01;
TEthylA-OH/$SiO_2$=0.528;
$H_2O$/$SiO_2$=8;
EtOH/$SiO_2$=9;
$H_2O$/TEThylA-OH=15.

A transparent liquid is obtained which is left to age until the following day, is then dried in a rotating drier under vacuum and finally calcined at 550° C. for 8 hours in air.

Figure 14:
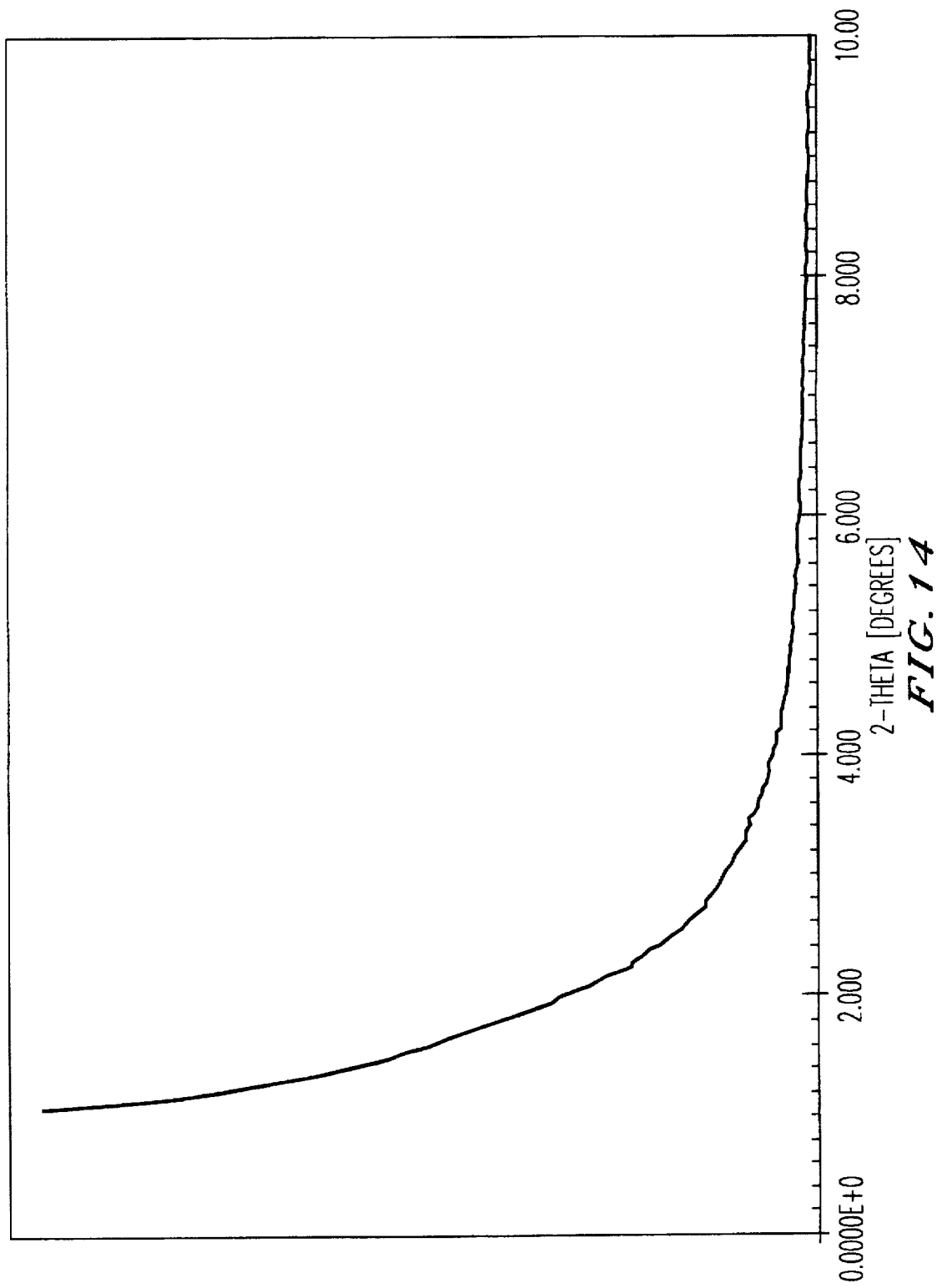

The XRD spectrum does not show significant scattering phenomena in the lower angular region of the spectrum (FIG. 14), whereas the B.E.T. analysis shows a specific surface area of 669 m$^2$/g, and a specific pore volume of 0.522 cm$^3$/g. The porosity distribution is very narrow mainly centred at values equal to 40 Å in diameter.

EXAMPLE 15 (comparative)

Gelification with tetrahexylammonium hydroxide (THexylA-OH) in an open system.

6.98 g of THexylA-OH (aqueous solution at 40% by weight) and 1 g of aluminium isopropoxide are mixed in a 400 cm$^3$ laboratory beaker. When the aluminium salt has completely dissolved, the heating is interrupted and a solution of 52 g of tetraethylorthosilicate (TES) in 100 g of ethanol (EtOH) is added, under stirring to the solution thus obtained. The composition of the mixture, expressed as molar ratios, is the following:

Al$_2$O$_3$/SiO$_2$=0.01;
THexylA-OH/SiO$_2$=0.03;
H$_2$O/SiO$_2$=8;
EtOH/SiO$_2$=9;
H$_2$O/THexylA-OH=267.

A transparent liquid is obtained which is left to age until the following day, is then dried in a rotating drier under vacuum and finally calcined at 550° C. for 8 hours in air.

Figure 15:
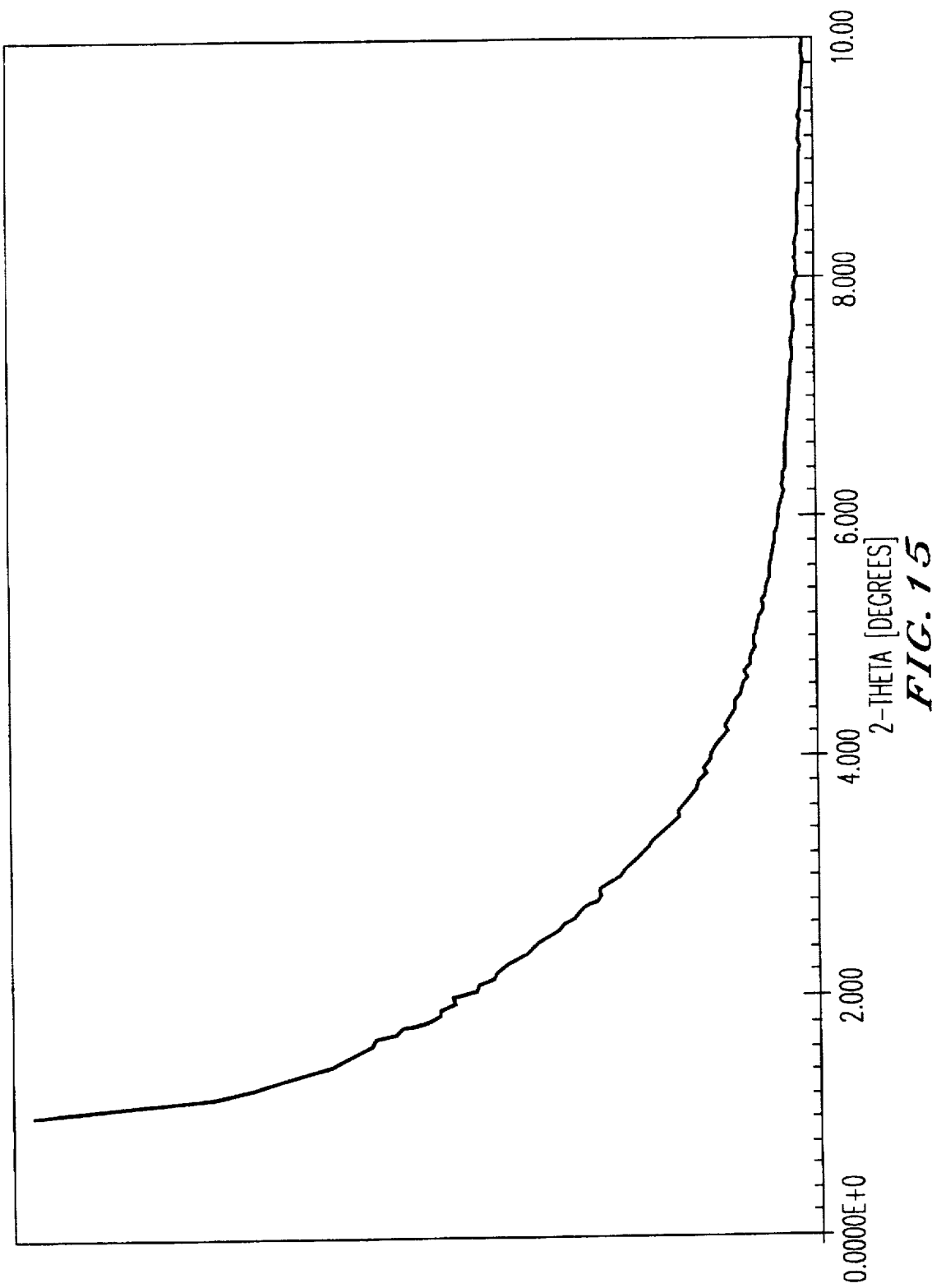

The XRD spectrum does not show significant scattering phenomena in the lower angular region of the spectrum (FIG. 15), whereas the B.E.T. analysis shows a specific surface area of 656 m$^2$/g, and a specific pore volume of 0.473 cm$^3$/g. The porosity distribution is very narrow mainly centred at values equal to 40 Å in diameter.

EXAMPLE 16 (comparative)

Gelification with tetrabutylammonium hydroxide (TButylA-OH) in an open system.

16.41 g of TButylA-OH (aqueous solution at 19% by weight) and 2.04 g of aluminium isopropoxide are mixed in a 400 cm$^3$ laboratory beaker. When the aluminium salt has completely dissolved, the heating is interrupted and a solution of 52 g of tetraethylorthosilicate (TES) in 100 g of ethanol (EtOH) is added, under stirring to the solution thus obtained. The composition of the mixture, expressed as molar ratios, is the following:
Al$_2$O$_3$/SiO$_2$=0.02;
TButylA-OH/SiO$_2$=0.05;
H$_2$O/SiO$_2$=8;
EtOH/SiO$_2$=9;
H$_2$O/TButylA-OH=160.

After about 60 minutes, a slightly opaque gel is formed which is left to age until the following day, is then dried in an oven at 120° C. under vacuum and finally calcined at 550° C. for 8 hours in air.

Figure 16:
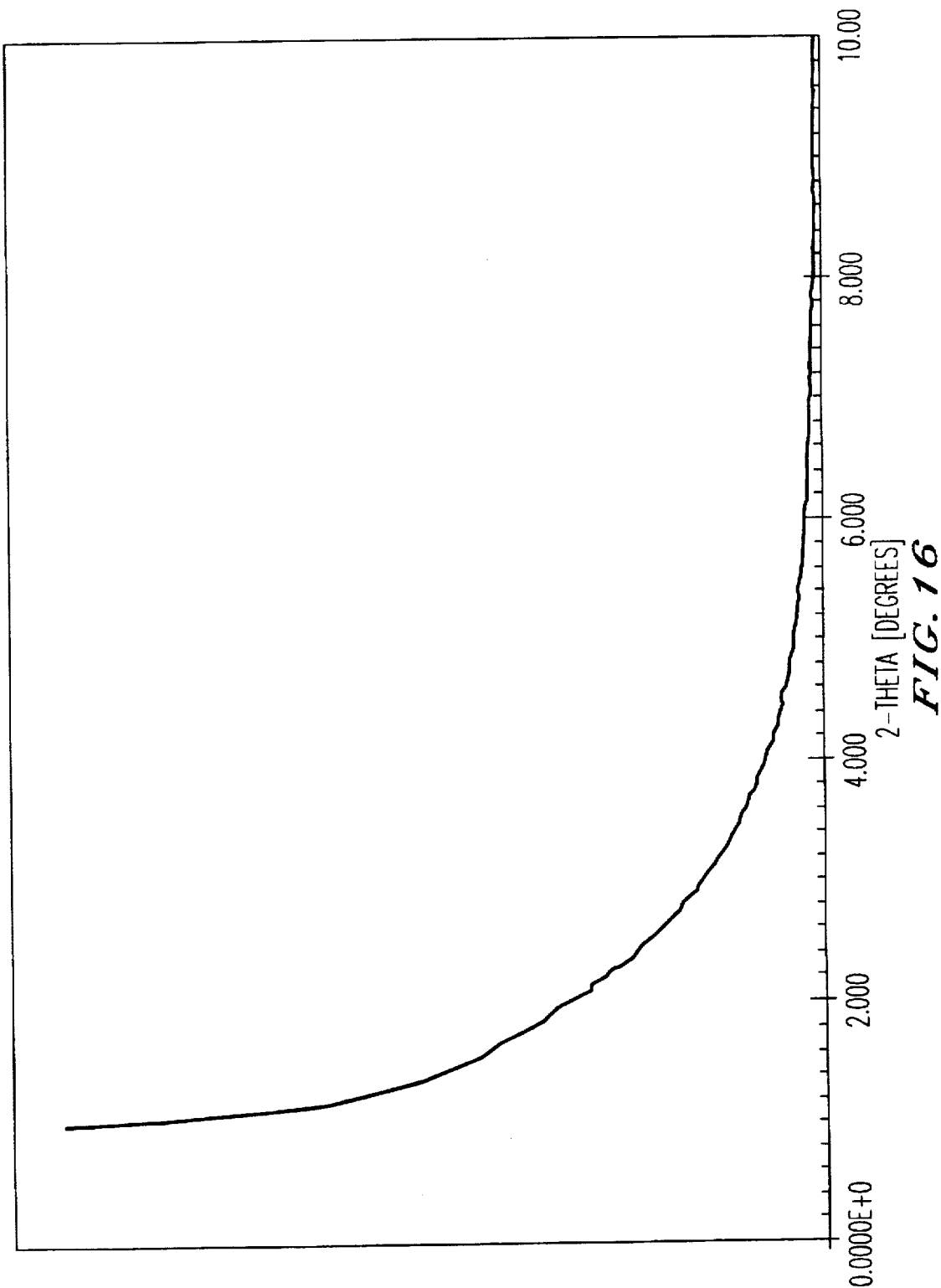

The XRD spectrum does not show significant scattering phenomena in the lower angular region of the spectrum (FIG. 16), whereas the B.E.T. analysis shows a specific surface area of 716 m$^2$/g, and a specific pore volume of 0.434 cm$^3$/g. The porosity distribution is quite enlarged with dimensions of less than 40 Å in diameter.

We claim:

1. Micro-mesoporous gel consisting of a silica matrix characterized by a monomodal distribution of the porosity; and by the presence of a single broad diffraction line, or in any case by a widespread scattering, at angular values not greater than 2θ=5°, with CuKα radiation and with the absence of other scattering phenomena coherent for greater angular values.

2. Micro-mesoporous gel according to claim 1, characterized by a surface area of between 500 m$^2$/g and 1200 m$^2$/g.

3. Micro-mesoporous gel of claim 1, characterized by a pore volume of between 0.3 cm$^3$/g and 1.3 cm$^3$/g.

4. Micro-mesoporous gel of claim 1, characterized by a pore diameter less than 40 Å.

5. Process for the preparation of the micro-mesoporous metal-silica gel of claim 1 comprising:

(a) subjecting to hydrolysis and gelification a solution of a tetra-alkyl orthosilicate in alcohol with an aqueous solution of a hydroxide of tetra-alkylammonium having the formula (I):

R'$_4$N—OH   (I)

the quantity of the constituents of the above solution being to respect the following molar ratios:

H$_2$O/SiO$_2$=5–30;
R—OH/SiO$_2$=5–10;
R'$_4$N$^+$/SiO$_2$=0.05–0.5;

whereas the ratio H$_2$O/R'$_4$N$^+$ varies according to the number of carbon atoms in the R' alkyl chain, in accordance with the values shown in Table 1 below;

TABLE 1

| R' | H$_2$O/R$_4$N$^+$ |
|---|---|
| THexylA-OH | ≦133 |
| TPentylA-OH | ≦100 |
| TButylA-OH | ≦73 |
| TPropylA-OH | ≦53 | operating at a temperature close to the boiling point, at atmospheric pressure, of the alcohol used in the solution of tetra-alkyl orthosilicate and of any alcohol which develops as by-product of the above hydrolysis reaction, without the elimination or substantial elimination of said alcohols from the reaction environment, preferably at a temperature of between 20° C. and 80° C.;

(b) subjecting the gel obtained in step (a) to drying and calcination.

6. Process according to claim 5, wherein the tetraalkyl orthosilicate is selected from tetramethylorthosilicate, tetraethylorthosilicate, tetrapropylorthosilicate, or tetraisopropylorthosilicate.

7. Process according to claim 6, wherein the tetraalkyl orthosilicate is tetraethylorthosilicate.

8. Process according to claim 5, wherein the alcohol used to dissolve the tetra-alkyl orthosilicate is ethanol.

9. The process of claim 5, wherein hydrolysis and gelification is of a solution of tetra-alkyl orthosilicate and one or more soluble or hydrolizable compounds of one or more metals whose oxides have a catalytic activity selected from transition metals or metals belonging to groups IIIA, IVA and VA at a molar ratio of metal oxides/SiO$_2$ of ≦0.05.

10. Process according to claim 9, wherein the soluble or hydrolizable compounds of one or more metals whose oxides have a catalytic activity, are selected from the hydrosoluble or hydrolizable salts or acids of the metals themselves.

11. Process according to claim 10, wherein the soluble or hydrolizable compounds of one or more metals are selected from aluminium tripropoxide, aluminium triisopropoxide and tetraethylorthotitanate.

12. Process according to claim 5, wherein the hydroxide of tetraalkylammonium having formula (I) is selected from tetrapropylammonium hydroxide, tetraisopropylammonium hydroxide, tetrabutylammonium hydroxide, tetraisobutylammonium hydroxide, tetraterbutylammonium hydroxide, tetrapentylammonium hydroxide, tetrahexylammonium hydroxide and tetraheptylammonium hydroxide.

13. Process according to claim 12, wherein the hydroxide of tetraalkylammonium having formula (I) is selected from tetrapropylammonium hydroxide, tetrabutylammonium hydroxide, tetrapentylammonium hydroxide and tetrahexylammonium hydroxide.

14. Process according to claim 5, wherein, in carrying out step (a), an aqueous solution of tetra-alkylammonium hydroxide having formula (I) is first prepared and, possibly, of one or more soluble or hydrolizable compounds of one or more metals, to which, after the complete dissolution of the metal compound or compounds when they are present, the alcohol solution of tetra-alkyl orthosilicate is subsequently added.

15. Process according to claim 5 wherein, in step (b), the gel obtained in step (a), is dried at a temperature of between 60° C. and 150° C. under vacuum and is finally calcinated in air at a temperature of between 450° C. and 550° C. for 6–12 hours.

16. The micro-mesoporous gel of claim 1, wherein one or more metal oxides selected from transition metals or metals belonging to groups IIIA, IVA and VA are uniformly dispersed throughout said silica matrix.

17. Use of the micro-mesoporous metal-silica gel according to any of the previous claims, as a heterogeneous catalyst, an absorbent or catalyst support in industrial processes in the fields of refinery, petrolchemistry, basic and fine chemistry.

* * * * *